US012020132B2

(12) United States Patent
Candel et al.

(10) Patent No.: US 12,020,132 B2
(45) Date of Patent: *Jun. 25, 2024

(54) EVOLVED MACHINE LEARNING MODELS

(71) Applicant: H2O.ai Inc., Mountain View, CA (US)

(72) Inventors: Arno Candel, San Jose, CA (US);
Dmitry Larko, San Ramon, CA (US);
Srisatish Ambati, Palo Alto, CA (US);
Prithvi Prabhu, Sunnyvale, CA (US);
Mark Landry, Round Rock, TX (US);
Jonathan C. McKinney, Palo Alto, CA (US)

(73) Assignee: H2O.ai Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/893,906

(22) Filed: Aug. 23, 2022

(65) Prior Publication Data

US 2023/0074025 A1     Mar. 9, 2023

Related U.S. Application Data

(63) Continuation of application No. 16/287,189, filed on Feb. 27, 2019, now Pat. No. 11,475,372.
(Continued)

(51) Int. Cl.
    *G06N 5/02*         (2023.01)
    *G06N 3/126*       (2023.01)
    *G06N 20/20*       (2019.01)

(52) U.S. Cl.
    CPC .............. *G06N 20/20* (2019.01); *G06N 3/126* (2013.01); *G06N 5/02* (2013.01)

(58) Field of Classification Search
    USPC .......................................................... 706/12
    See application file for complete search history.

(56) References Cited

U.S. PATENT DOCUMENTS 8,370,280 B1    2/2013   Lin
10,943,301 B1 *   3/2021   Wu ......................... G06F 17/18
(Continued)

FOREIGN PATENT DOCUMENTS

WO      2017166449      10/2017

OTHER PUBLICATIONS

Li et al., "Privacy Protection in Data Mining", 2003.
(Continued)

*Primary Examiner* — Lut Wong
(74) *Attorney, Agent, or Firm* — Van Pelt, Yi & James LLP

(57) ABSTRACT

A plurality of initial machine learning models are determined based on a plurality of original features. The plurality of initial machine learning models are filtered by selecting a subset of the initial machine learning models as one or more surviving machine learning models. One or more evolved machine learning models are generated. At least one of the evolved machine learning models is based at least in part on one or more new features, which are based at least in part on a transformation of at least one of features of the one or more surviving machine learning models. Corresponding validation scores associated with the one or more evolved machine learning models and corresponding validation scores associated with the one or more surviving machine learning models are compared. At least one of the one or more
(Continued)

evolved machine learning models or the one or more surviving machine learning models are selected as one or more new selected surviving machine learning models.

20 Claims, 8 Drawing Sheets

Related U.S. Application Data

(60) Provisional application No. 62/648,203, filed on Mar. 26, 2018.

(56) References Cited

U.S. PATENT DOCUMENTS

| | | |
|---|---|---|
| 2015/0193697 A1 | 7/2015 | Vasseur |
| 2016/0048766 A1 | 2/2016 | McMahon |
| 2016/0110340 A1* | 4/2016 | Bojja ............... G06F 40/263 704/9 |
| 2016/0110657 A1 | 4/2016 | Gibiansky |
| 2016/0132787 A1 | 5/2016 | Drevo |
| 2016/0358099 A1 | 12/2016 | Sturlaugson |
| 2016/0359697 A1 | 12/2016 | Scheib |
| 2017/0185904 A1 | 6/2017 | Padmanabhan |
| 2017/0193066 A1* | 7/2017 | Zhu ................. G06F 16/254 |
| 2020/0058041 A1* | 2/2020 | Bharwani .......... G06Q 30/0202 |

OTHER PUBLICATIONS

Thenmozhi et al.: "Feature Engineering and Characterization of Classifiers for Consumer Health Information Search", Jan. 4, 2018 (Jan. 4, 2018), ICIAP: International Conference on Image Analysis and Processing, 17th International Conference, Naples, Italy, Sep. 9-13, 2013. Proceedings; [Lecture Notes in Computer Science; Lect.Notes Computer], Springer, Berlin, Heidelberg, XP047460435, ISBN: 978-3-642-17318-9.

Wang et al.: "Randomized Feature Engineering as a Fast and Accurate Alternative to Kernel Methods", Research & Development in Information Retrieval, ACM, 2 Penn Plaza, Suite 701, New York, NY 10121-0701 USA, Aug. 4, 2017 (Aug. 4, 2017), pp. 485-494, XP058633617, DOI: 10.1145/3097983.3098001, ISBN: 978-1-4503-5657-2.

Wind et al.: "Model Selection in Data Analysis Competitions", MLAS '14: Proceedings of the 2014 International Conference on Meta-Learning and Algorithm Selection, vol. 1201, Sep. 19, 2014 (Sep. 19, 2014), pp. 55-60, XP055861803, Retrieved from the Internet: URL: http://ceur-ws.org/Vol-1201/paper-14.pdf.

* cited by examiner

200 ⟶

|  | $F_1$ | $F_2$ | ... | $F_n$ | Prediction |
|---|---|---|---|---|---|
| $A_1$ | $X_1$ | $Y_1$ | ... | $Z_1$ | $P_1$ |
| $A_2$ | $X_2$ | $Y_2$ | ... | $Z_2$ | $P_2$ |
| ... | ... | ... | ... | ... | ... |
| $A_n$ | $X_n$ | $Y_n$ | ... | $Z_n$ | $P_n$ |

|  | $F_1$ | $F_2$ | ... | $F_n$ | $E_1$ | Prediction |
|---|---|---|---|---|---|---|
| $A_1$ | $X_1$ | $Y_1$ | ... | $Z_1$ | $XX_1$ | $P_{1'}$ |
| $A_2$ | $X_2$ | $Y_2$ | ... | $Z_2$ | $YY_2$ | $P_{2'}$ |
| ... | ... | ... | ... | ... | ... | ... |
| $A_n$ | $X_n$ | $Y_n$ | ... | $Z_n$ | $ZZ_n$ | $P_{n'}$ |

FIG. 2B

EVOLVED MACHINE LEARNING MODELS

CROSS REFERENCE TO OTHER APPLICATIONS

This application is a continuation of U.S. patent application Ser. No. 16/287,189 entitled EVOLVED MACHINE LEARNING MODELS filed Feb. 27, 2019, now U.S. Pat. No. 11,475,372, which claims priority to U.S. Provisional Patent Application No. 62/648,203 entitled EVOLVED MACHINE LEARNING MODELS filed Mar. 26, 2018, each of which is incorporated herein by reference for all purposes.

BACKGROUND OF THE INVENTION

Machine learning is a field of computer science that gives computers the ability to learn without being explicitly programmed. A machine learning model (MLM) can be trained to implement a complex function is configured to generate one or more predictions based on a set of inputs. Once trained, the MLM acts like a black box: it receives a set of inputs, the set of inputs are applied to the complex function, and one or more predictions are outputted. However, the accuracy of such predictions is limited based on the specifics of the model and the initial features included in the set of inputs.

BRIEF DESCRIPTION OF THE DRAWINGS

Various embodiments of the invention are disclosed in the following detailed description and the accompanying drawings.

FIG. 2A is a diagram illustrating an embodiment of an input dataset.

FIG. 2B is a diagram illustrating an embodiment of an input dataset.

DETAILED DESCRIPTION

Figure 1:
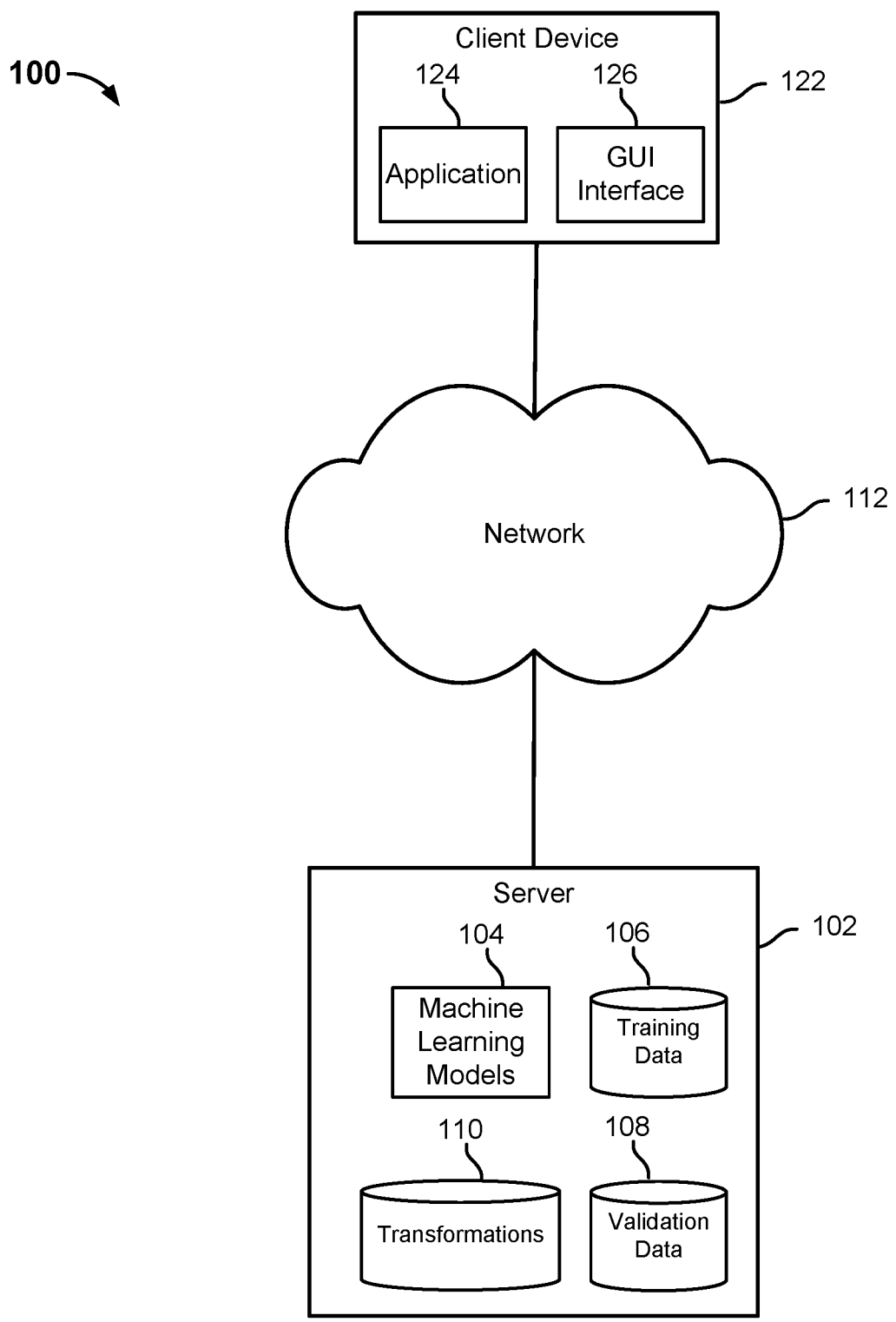
FIG. 1 is a block diagram illustrating an embodiment of a system for generating evolved machine learning models.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An evolutionary machine learning model technique is disclosed. A set of input data is received. The input data is comprised of a plurality of entries. Each entry is associated with a plurality of features and corresponding feature values. The input data may be split into training data and validation data. In some embodiments, a feature of the plurality of features is selected. In other embodiments, a feature not included in the plurality of features is selected. The selected feature is a feature for which a machine learning model will be trained to predict a corresponding feature label (e.g., feature value).

A plurality of initial machine learning models are trained using the training data to provide the prediction. Each initial machine learning model may be trained using a subset of the features. An initial machine learning model may be generated using a machine learning algorithm, such as decision trees, naïve Bayes classification, least squares regression, logistic regression, support vector machines, neural networks, deep learning, etc. The predicted feature label of an initial machine learning model is compared to the actual feature value of the training data. The initial machine learning model may be adjusted based on the comparison. For example, one or more weights associated with the one or more features included in the initial machine learning model may be adjusted to improve the accuracy of the initial machine learning model.

The plurality of initial machine learning models may be validated using the validation data. The predicted feature label of an initial machine learning model is compared to the actual feature value. The plurality of initial machine learning models are scored based at least in part on a validation score.

In some embodiments, a validation score of an initial machine learning model is determined by computing the difference between the predicted feature label and the actual feature value for an entry. The validation score of the machine learning model for an entry (e.g. accuracy for the entry) may be determined as:

$$\text{Validation Score} = \text{Loss}(\text{Actual}, \text{Predicted}) \quad (1)$$

The overall validation score of the machine learning model for all the entries (e.g., overall accuracy) may be determined as:

$$\text{Overall Validation Score} = \frac{\sum \text{Validation Score for each Entry}}{\text{\# of Entries}} \quad (2)$$

In other embodiments, a sampled validation score of the initial machine learning model is determined by computing the difference between the predicted feature label of the actual feature value for a first plurality of random entries of the validation data. The validation score for each of the random entries may be computed using equation (1). An overall validation score of the random entries may be computed using equation (2). A second plurality of random entries of the validation data may be sampled. The second plurality of random entries may include one or more entries included in the first plurality of random entries. The validation score for each of the random entries included in the second plurality may be computed using equation (1). An overall validation score of the random entries may be computed using equation (2). The process of selecting a plurality of random entries, computing an entry validation score, and an overall validation score for the plurality of random entries may be repeated until a stopping condition has been reached (e.g., threshold number of iterations, duration). A sampled validation score may be determined as:

$$\text{Sampled Validation Score} = \frac{\sum \text{Overall Validation Score for each plurality of random entires}}{\text{\# of pluralities}} \quad (3)$$

The plurality of initial machine learning models may be ranked based on the scores. The plurality of initial machine learning models may be filtered based on the ranking. In some embodiments, the top performing initial machine learning models (e.g., top half, top number, i.e., top 2, top percentage) are retained as one or more surviving machine learning models and half of the non-top performing initial machine learning models are discarded, based on a pair-wise elimination after random pair assignment.

One or more evolved machine learning models may be generated. An evolved machine learning model is a machine learning model that includes one or more new features that are based on one or more important features of the one or more surviving machine learning models. One or more important features of the one or more surviving machine learning models may be determined.

In some embodiments, the one or more important features are determined based on the number of times a feature is used to split a decision tree. The one or more important features may be determined based on a location of the feature within the decision tree split. For example, a feature that is used to split a decision tree at the top of the decision tree may be more important than a feature that is used to split a decision tree at the bottom of the decision tree.

In other embodiments, the one or more important features are determined by randomly rearranging the feature values corresponding to a feature and comparing the predictions of the machine learning model with the randomly rearranged feature values with the predictions of the machine learning model without the randomly rearranged feature values. In the event the validation score of the prediction of the machine learning model improves with the random feature data, the feature is determined to be an untrustworthy feature and not to be an important feature. In the event the validation score of the prediction of the machine learning model does not change within a threshold statistical amount (e.g., 5%) with the random feature data, the feature is determined not to be an important feature. In the event the validation score of the prediction of the machine learning model decreases more than a threshold statistical amount (e.g., 5%) with the random feature data, the feature is determined to be an important feature.

The one or more new features may be generated at least in part by performing a transformation on at least one of the one or more important features.

In some embodiments, the one or more important features include one or more important features of one of the surviving machine learning models. In other embodiments, the one or more important features include one or more important features of any of the surviving machine learning models. In some embodiments, the one or more important features include a feature that is important to a plurality of the surviving machine learning models (i.e., a feature is identified as an important feature for multiple surviving machine learning models). In some embodiments, the one or more important features includes a combination of important features from different surviving machine learning models (e.g., feature X is an important feature for surviving machine learning model A and feature Y is an important feature for surviving machine learning model B).

A transformation performs an operation on one or more features to create a new feature. For example, a transformation may perform an operation that combines the features values associated with two different features to create a new feature. The transformation may be selected based on a data type associated with a feature value of the one or more important features. A data type associated with a feature value may be a float value, an integer value, an ordinal value, a categorical value, a string, etc. A transformation may use a string as an input and an important feature that has a string value for a feature value may be selected. The transformation may be randomly selected.

The one or more evolved machine learning models are trained using the training data. An evolved machine learning model may be trained using one or more new features and a subset of the original features. In some embodiments, the subset of the original features does not include the one or more original features of which the one or more new features are based. The subset of original features does not include the feature for which a prediction is to be made. An evolved machine learning model may be generated using the same machine learning algorithm as a surviving machine learning model or a different machine learning algorithm. The predicted feature label of an evolved machine learning model is compared to the actual feature value of the training data. The evolved machine learning model may be adjusted based on the comparison. For example, one or more weights associated with the one or more features included in the evolved machine learning model may be adjusted to improve the validation score of the feature value prediction.

The one or more of evolved machine learning models may be validated using the validation data. The predicted feature label of an evolved machine learning model is compared to the actual feature value. The plurality of evolved machine learning models are scored based at least in part on the prediction validation score.

In some embodiments, the validation score of an evolved machine learning model is determined by computing (1) and (2).

In other embodiments, a sampled validation score of the evolved machine learning model is determined by computing the difference between the predicted feature label of the actual feature value for a first plurality of random entries of the validation data. The validation score for each of the random entries may be computed using equation (1). An overall validation score of the random entries may be computed using equation (2). A second plurality of random entries of the validation data may be sampled. The second plurality of random entries may include one or more entries included in the first plurality of random entries. The validation score for each of the random entries included in the second plurality may be computed using equation (1). An overall validation score of the random entries included in the second plurality may be computed using equation (2). A sampled validation score may be determined by using equation (3). The process of selecting a random entries, computing an entry level validation score, and an overall validation score for the plurality of random entries may be repeated until a stopping condition has been reached (e.g., threshold number of iterations, duration).

In the event the stopping condition has not been reached, the prediction validation score of an evolved machine learning model is compared to the prediction validation score associated with the one or more surviving machine learning models. Each evolved machine learning model is scored based on the prediction validation score. The overall validation score of an evolved machine learning model may be compared to the overall validation score of the surviving machine learning models. In some embodiments, the top performing one or more evolved machine learning models and one or more surviving machine learning models (e.g., top half, top number, i.e., top 2, top percentage) are retained as one or more surviving machine learning models and non-top performing evolved machine learning models and surviving machine learning models are discarded, based in part on a pair-wise elimination after random pair assignment. In other embodiments, an evolved machine learning model is paired with a surviving machine learning model. In some embodiments, between the evolved machine learning model and the surviving machine learning model, the machine learning model with the higher overall validation score is retained as the surviving machine learning model and the machine learning model with the lower overall validation score is discarded. In other embodiments, the overall validation score of the evolved machine learning model must be greater than a statistical measure (e.g., outside the range of entry validation scores) of the of the surviving machine learning model in order to retain the evolved machine learning model as the surviving machine learning model. This may prevent overfitting of the model to a set of features.

The one or more surviving machine learning models and one or more evolved machine learning models may be filtered based on the ranking. The top performing machine learning models (e.g., top half, top number) may be retained as surviving machine learning models and half of the non-top performing machine learning models may be discarded, based in part on a pair-wise elimination after random pair assignment.

In the event the stopping condition has been reached, the remaining machine learning models are scored and ranked.

The process of generating one or more evolved machine learning models and comparing the evolved machine learning models to one or more surviving machine learning models is an improvement to the field of machine learning. Instead of being limited to the features that are included in an input dataset, a machine learning model may evolve and improve its prediction by generating one or more new features. The process repeats itself until a stopping condition has been reached. As a result, the process seeks to improve the prediction of the machine learning model with each iteration.

In some embodiments, an ensemble model is generated. An ensemble model is comprised of a plurality of machine learning models. A plurality of versions of the input data may be created. Each version of the input data has corresponding training data and validation data. Some or none of the training data and/or validation data may overlap between versions. A plurality of machine learning models are generated and validated for each version of input data. A validation data set may be applied to each of the plurality of machine learning models and a validation score is determined for each machine learning model. An overall score may be determined for the ensemble model based on each of the validation scores of the machine learning models. The overall score may be used to adjust a weight associated with a machine learning model. The weight may be an overall weight associated with the machine learning model. The weight may be an individual weight associated with one of the internal weights associated with the machine learning model. By adjusting a weight associated with a machine learning model, the influence of the machine learning model on the overall score for the ensemble may be limited and the overall accuracy of the ensemble model predictions may be improved.

FIG. 1 is a block diagram illustrating an embodiment of a system for generating evolved machine learning models. In the example shown, system 100 includes a server 102, a network 112, and a client device 122.

Server 102 includes a plurality of machine learning models 104, training data 106, validation data 108, and transformations 110. Server 102 may receive input data. The input data may be received from client device 122 or another device connected to the server 102 via network 112. The input data is comprised of a plurality of entries. Each entry is associated with a plurality of original features and corresponding feature values. The input data may be split into training data 106 and validation data 108. The training data 106 includes a first plurality of entries and the validation data 108 includes a second plurality of entries. The input data may be split in different versions of training data and different versions of validation data.

Server 102 may receive a selection of a feature of the input data for which a prediction is to be made. Server 102 is configured to generate a machine learning model that predicts a feature label for a feature based on a set of selected features and corresponding feature values associated with an entry. The set of selected features comprise a subset of the input data features. The subset of input data features may comprise some or all of the features except for the selected feature for which a prediction is to be made.

Server 102 may be configured to generate a plurality of machine learning models based on the training data. A machine learning model may be generated using a machine learning algorithm, such as decision trees, naïve Bayes classification, least squares regression, logistic regression, support vector machines, neural networks, deep learning, etc. A machine learning model may be trained using the same set of features as another machine learning model, but use a different machine learning algorithm. A machine learning model may be trained using the same machine learning algorithm as a different machine learning model, but trained using a different subset of features.

Server 102 is configured to store a plurality of transformations 110. In some embodiments, a combination of one or more original features may undergo a transformation by a transformer. In other embodiments, a combination of one or more new features and one or more original features may undergo a transformation by a transformer. In other embodiments, a combination of one or more new features may undergo a transformation by a transformer.

le;2.3qThe transformers may include a filter transformer, a frequent transformer, a bulk interactions transformer, a truncated SVD numeric transformer, a cross validation target encoding transformer, cross validation categorical to numeric encoding transformer, a dates transformer, a date polar transformer, a text transformer, a categorical target encoding transformer, a numeric to categorical target encoding transformer, a cluster target encoding transformer, a cluster distance transformer, a weight of evidence, and/or a numeric to categorical weight of evidence transformer.

Consider an example dataset:

| Date Built | Square Footage | # Beds | # Baths | State | Price |
|---|---|---|---|---|---|
| Jan. 1, 1920 | 1700 | 3 | 2 | NY | 700,000 |

The filter transformer may pass through a numeric feature in the dataset. For example, a filter transformer takes the price column in the dataset and outputs the price column unaltered.

The frequent transformer may count each value in the categorical column. This count can be either the raw count or the normalized count. For example, the example dataset can be transformed to be:

| Date Built | Square Footage | # Beds | # Baths | State | Price | Freq_State |
|---|---|---|---|---|---|---|
| Jan. 1, 1920 | 1700 | 3 | 2 | NY | 700,000 | 4,500 |

This transformation indicates that there are 4,500 properties in this dataset with state=NY.

The bulk interactions transformer may add, divide, multiply, and/or subtract two columns in the feature dataset. For example, the example dataset can be transformed to be:

| Date Built | Square Footage | # Beds | # Baths | State | Price | Interaction_#Beds-#Baths |
|---|---|---|---|---|---|---|
| Jan. 1, 1920 | 1700 | 3 | 2 | NY | 700,000 | 1 |

This transformation indicates that there is one more bedroom than there are number of bathrooms for this property.

The truncated singular value decomposition (SVD) numeric transformer may train on a selected numeric columns in the dataset. The components of the truncated SVD will be new features. For example, the example dataset can be transformed to be:

| Date Built | Square Footage | # Beds | # Baths | State | Price | TruncSVD_Price_#Beds_#Baths_1 |
|---|---|---|---|---|---|---|
| Jan. 1, 1920 | 1700 | 3 | 2 | NY | 700,000 | 0.632 |

The first component of the truncated SVD of the columns Price, Number of Beds, Number of Baths.

The label encoding transformer may convert a categorical column to a numeric column by creating a lexicographic mapping of categorical values to enumerated integers. For example, the example dataset may include a "type" feature column for a property and include a value of "condo," "townhouse," or "single-detached." The label encoding transformer may convert "condo," "townhouse," and "single-detached" to be "1," "2," and "3", respectively.

The dates transformer may retrieve any data values (e.g., year, quarter, month, day, day of year, week, week day, hour, minute, second, etc.). For example, the example dataset can be transformed to be:

| Date Built | Square Footage | # Beds | # Baths | State | Price | DateBuilt_Month |
|---|---|---|---|---|---|---|
| Jan. 1, 1920 | 1700 | 3 | 2 | NY | 700,000 | 1 |

This indicates that the home was built in the month of January.

The date polar transformer may expand the date using polar coordinates. The date transformer will only expand the date into different units, for example month. This does not capture the similarity between the months December and January (12 and 1) or the hours 23 and 0. The polar coordinates capture the similarity between these cases by representing the unit of the data as a point in a cycle. For example, the polar units of: get minute in hour, would be the minute position on a clock. For example, the example dataset can be transformed to be:

| Date Built | Square Footage | # Beds | # Baths | State | Price | DateBuilt_MonthInYear_X | DateBuilt_MonthInYear_Y |
|---|---|---|---|---|---|---|---|
| Jan. 1, 1920 | 1700 | 3 | 2 | NY | 700,000 | 0.5 | 1 |

The polar coordinates of the month January in year is (0.5, 1). This allows the model to catch the similarities between January and December. This information was not captured in the sample Date Transformer.

The text transformer may transform a text column using TFIDF (term frequency-inverse document frequency) or count (count of the word). This may be followed by dimensionality reduction using truncated SVD.

The categorical target encoding transformer may perform cross validation target encoding on a categorical column. For example, the example dataset can be transformed to be:

| Date Built | Square Footage | # Beds | # Baths | State | Price | CV_TE_State |
|---|---|---|---|---|---|---|
| Jan. 1, 1920 | 1700 | 3 | 2 | NY | 700,000 | 550,000 |

The average price of properties in NY state is $550,000. In order to prevent overfitting, the average on out-of-fold data is computed using cross validation.

The numeric to categorical target encoding transformer may convert a numeric column to categorical by binning. Cross validation target encoding is done on the binned numeric column. For example, the example dataset can be transformed to be:

| Date Built | Square Footage | # Beds | # Baths | State | Price | CV_TE_SquareFootage |
|---|---|---|---|---|---|---|
| Jan. 1, 1920 | 1700 | 3 | 2 | NY | 700,000 | 345,000 |

The column "Square Footage" has been bucketed into 10 equally populated bins. This property lies in the "Square Footage" bucket 1,572 to 1,749. The average price of properties with this range of square footage is $345,000. In order to prevent overfitting, Driverless AI calculates this average on out-of-fold data using cross validation.

The cluster target encoding transformer may cluster selected columns in the data and target encoding is done on the cluster ID. For example, the example dataset can be transformed to be:

| Date Built | Square Footage | # Beds | # Baths | State | Price | ClusterTE_4_#Beds_#Baths_SquareFootage |
|---|---|---|---|---|---|---|
| Jan. 1, 1920 | 1700 | 3 | 2 | NY | 700,000 | 450,000 |

The columns "#Beds," "#Baths," and "Square Footage" have been segmented into four clusters.
The average price of properties in the same cluster as the selected property is $450,000. In order to prevent overfitting, Driverless AI calculates this average on out-of-fold data using cross validation.

The cluster distance transformer may cluster selected columns in the data and the distance to a chosen cluster center is calculated. For example, the example dataset can be transformed to be:

| Date Built | Square Footage | # Beds | # Baths | State | Price | ClusterDist_4_#Beds_#Baths_SquareFootage_1 |
|---|---|---|---|---|---|---|
| Jan. 1, 1920 | 1700 | 3 | 2 | NY | 700,000 | 0.83 |

The columns "#Beds," "#Baths," and "Square Footage" have been segmented into four clusters. The difference from this record to Cluster 1 is 0.83.

A weight of evidence may create log-likelihood type of features using the weights of evidence (WOE) transformation method. The weight of evidence tells the predictive power of an independent variable in relation to the dependent variable, for example, the measure of good customers in relations to bad customers. WOE=IN (Distribution of Goods/Distribution of Bads).

The numeric to categorical weight of evidence transformer may convert a numeric column to categorical by binning and then creates the likelihood type of features using the WOE transformation method.

Server 102 may be implemented using one or more computing devices such as a computer, a multi-processor system, a microprocessor-based system, a special purpose device, a distributed computing environment including any of the foregoing systems or devices, or other appropriate hardware/software/firmware combination that includes one or more processors, and memory coupled to the processors and configured to provide the processors with instructions.

Network 112 connects server 102 to client device 122. Network 112 comprises one or more of the following: a local area network, a wide area network, a wired network, a wireless network, the Internet, an intranet, or any other appropriate communication network.

Client Device 122 includes a web browser or other client application 124 that is accessible by a user of the client device 122. Examples of client device 240 include a computer, a laptop, a desktop, a tablet, a mobile device, a PDA, or any other device that operates a web browser or client application.

A user of client device 122 may enter a selection via GUI interface 126 to select a feature of the input data for which a prediction is to be made. The selection may be provided from application 124 to server 102 via network 112. After a prediction has been made, client device 122 may receive from server 102 a prediction for the selected feature.

FIG. 2A is a diagram illustrating an embodiment of an input dataset. Input dataset 200 may be implemented by a server, such as server 102. Input dataset 200 may be used to generate an initial machine learning model.

In the example shown, input dataset 200 includes entries $A_1, A_2 \ldots A_n$. Each entry is comprised of one or more features having a corresponding feature value. For example, entry $A_1$ is comprised of features $F_1, F_2 \ldots F_n$ that have corresponding feature values of $X_1, Y_1 \ldots Z_1$. Entry $A_2$ is comprised of features $F_1, F_2 \ldots F_n$ that have corresponding feature values of $X_2, Y_2 \ldots Z_2$. Entry $A_n$ is comprised of features $F_1, F_2 \ldots F_n$ that have corresponding feature values of $X_n, Y_n \ldots Z_n$. In some embodiments, a feature value may correspond to the actual value of a feature (e.g., temperature=98°). In other embodiments, a feature value may correspond to one of the ranges of values (e.g., a value of "2" indicates a temperature range of 20-40). In other embodiments, a feature value may correspond to one of the possible non-numerical values (e.g., "0"=male, "1"=female). In other embodiments, the feature value may be a text string (e.g., "red," "yellow").

A machine learning model, such as machine learning model 104, may be configured to perform a prediction for a selected feature based on the other features and their corresponding feature values. For example, a model may be configured to output a prediction for $F_1$ based at least in part on some of the features $F_2 \ldots F_n$ and their corresponding feature values. The machine learning model is configured to output a prediction of $P_1, P_2 \ldots P_n$ for entries $A_1, A_2 \ldots A_n$, respectively. In some embodiments, the prediction is a predicted feature label for the selected feature. In some embodiments, the prediction is a predicted feature label for the selected feature and provided with a statistical confidence (e.g., 90% confident). In some embodiments, the predication is a predicted value for the selected feature and provided with a range (e.g., 120 mph±15 mph.)

The validation score of the machine learning model may be determined from the predictions. For example, the difference between the predicted feature label and the actual feature value may be determined for an entry. The validation score of the machine learning model for an entry may be determined by computing (1). The overall validation score of the machine learning model for all the entries may be determined by computing (2).

FIG. 2B is a diagram illustrating an embodiment of an input dataset. In the example shown, input dataset 250 may be implemented by a system, such as server 102. Input dataset 250 may be a dataset used to generate an evolved machine learning model.

In the example shown, input dataset 250 includes entries $A_1, A_2 \ldots A_n$. The entries for input dataset 250 are the same entries for input dataset 200, except for one or more features have been transformed based on the original features $(F_1, F_2 \ldots F_n)$. A combination of the original features may undergo a transformation by a transformer. The transformers may include a filter transformer, a frequent transformer, a bulk interactions transformer, a truncated SVD numeric transformer, a cross validation target encoding, cross validation categorical to numeric encoding transformer, a dates transformer, a date polar transformer, a text transformer, a categorical target encoding transformer, a numeric to categorical target encoding transformer, a cluster target encoding transformer, a cluster distance transformer, a weight of evidence, and/or a numeric to categorical weight of evidence transformer.

In some embodiments, input dataset 250 is updated to include an additional column for a new feature. In other embodiments, the new feature is computed without having to store the value in the input dataset 250.

A machine learning model, such as one of the machine learning models 104, may be configured to perform a prediction based on a combination of at least one original feature and its corresponding value and the one or more new features and their corresponding values. For example, a machine learning model may output a prediction label of $P_{1'}$, $P_{2'} \ldots P_{n'}$ for inputs $A_1, A_2 \ldots A_n$, respectively. The prediction may be a predicted feature label for the selected feature. The prediction may be a predicted feature label for the selected feature and provided with a statistical confidence (e.g., 90% confident). The predication may be a predicted label for the selected feature and provided with a range (e.g., 120 mph±15 mph.)

The validation score of the evolved machine learning model may be determined from the predictions. For example, the difference between the predicted feature label and the actual feature value may be determined for an entry. The validation score of the evolved machine learning model for an entry may be determined by computing (1). The overall validation score of the evolved machine learning model for all the entries may be determined by computing (2).

In some embodiments, the overall validation score of an evolved machine learning model is compared to the overall validation score of a surviving machine learning model. In some embodiments, the evolved machine learning model is determined to be more valid (e.g., more accurate) than the surviving machine learning model in the event the overall validation score of the evolved machine learning model is greater than the overall validation score of the surviving machine learning model. In other embodiments, the overall validation score of the evolved machine learning model is compared to the entry validation scores of the surviving machine learning model. In the event the overall validation score of the evolved machine learning model is within the range of entry validation scores of the surviving machine learning model, then the evolved machine learning model is determined not to be more valid (e.g., not as accurate) than the surviving machine learning model. In the event the overall validation score of the evolved machine learning model exceeds the range of entry validation scores of the surviving machine learning model, then the evolved machine learning model is determine to be more valid (e.g., more accurate) than the surviving machine learning model.

Figure 3:
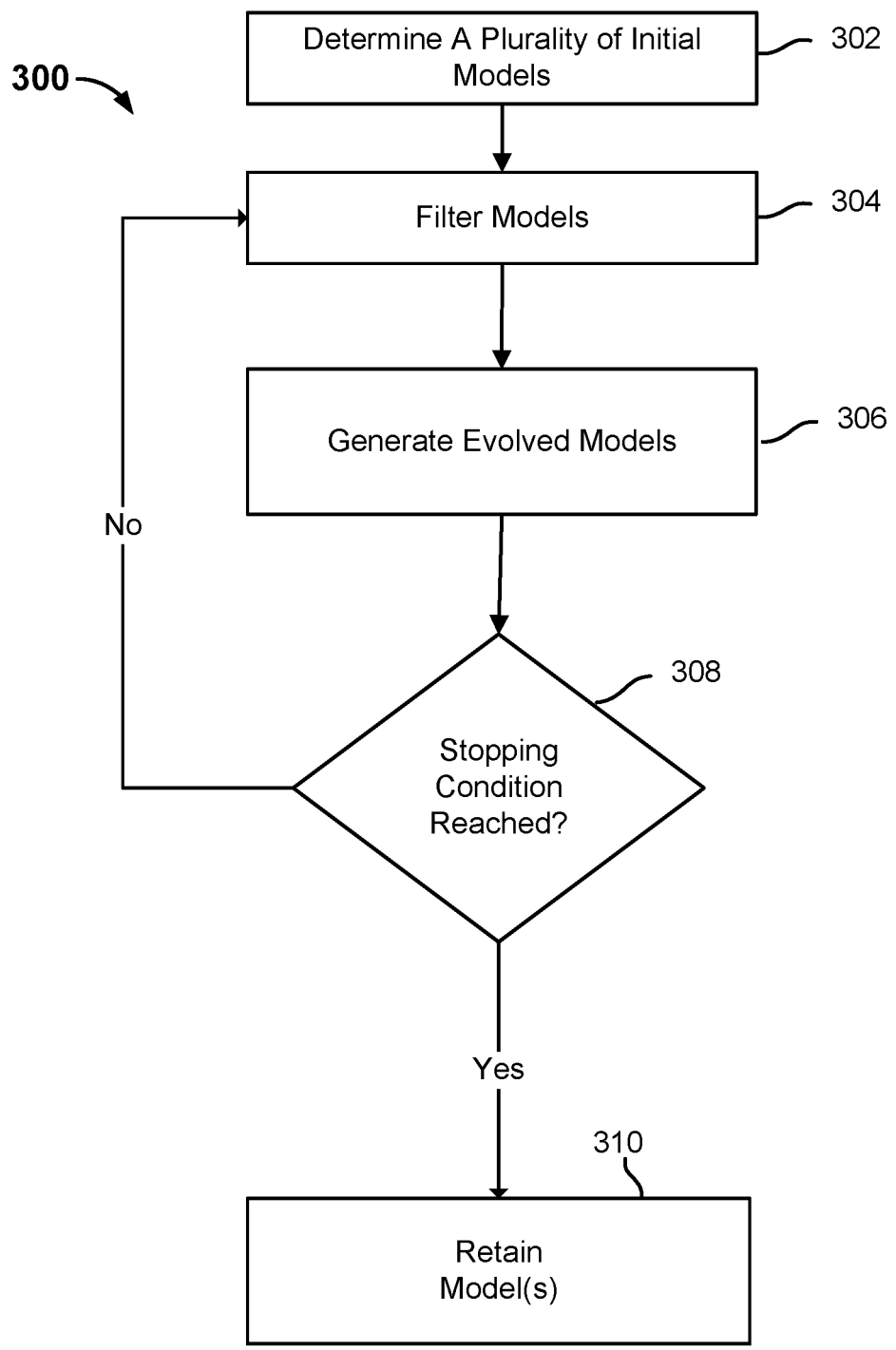
FIG. 3 is a flow chart illustrating an embodiment of a process for generating an evolved machine learning model.

FIG. 3 is a flow chart illustrating an embodiment of a process for generating an evolved machine learning model. Process 300 may be implemented by a server, such as server 102.

At 302, a plurality of initial machine learning models are determined. The plurality of initial machine learning models may be configured to output a prediction associated with one of the features included in a dataset based on a plurality of other features included in the dataset and their corresponding feature values. For example, a feature included in the dataset may be "age." An initial machine learning model, given a set of other features and corresponding feature values, may be configured to predict the "age" associated with an entry. In some embodiments, the prediction label is provided with a statistical confidence value (e.g., 90% confident). In other embodiments, the prediction label is provided with a range (e.g., 18 years±5 years).

The plurality of initial machine learning models may be configured to output a prediction associated with a feature not included in the dataset based on the plurality of features included in the dataset and their corresponding values. For example, a feature not included in the dataset may be "maximum speed." However, the dataset may include "make" and "model" features. An initial machine learning model, given a set of features and corresponding feature values, may be configured to predict the "maximum speed" associated with an entry. In some embodiments, the prediction label is provided with a statistical confidence value (e.g., 90% confident). In other embodiments, the prediction label is provided with a range (e.g., 120 mph±15 mph).

The feature and corresponding feature value for which a prediction is made may be selected by a user. For example, a user may select "age" or "maximum speed" as the feature for which a corresponding prediction is to be made.

A set of input data is received. The input data is comprised of a plurality of entries. Each entry is comprised of a plurality of features and corresponding feature values. The input data is split into training data and validation data. Each initial machine learning model may be trained using a subset of the plurality of features. The subset of features of a first initial machine learning model may use all, some, or none of the features associated with the subset of features of a second initial machine learning model.

The initial machine learning models may be generated based on a machine learning algorithm (e.g., decision trees, naïve Bayes classification, least squares regression, logistic regression, support vector machines, neural networks, deep learning, etc.). In some embodiments, a first initial machine learning model is generated using the same machine learning algorithm type as another initial machine learning model, but the subset of features associated with the first initial machine learning model is different than the subset of features associated with the second initial machine learning model. In other embodiments, the first initial machine learning model is generated using a different machine learning algorithm type as another initial machine learning models. In some embodiments, the first initial machine learning model may generated based on the same subset of features as a second initial machine learning model, but the first and second initial machine learning models are generated using different machine learning algorithm types.

The plurality of initial machine learning models may trained using the training data to output a predicted feature label for a feature. The training data may be used to adjust the plurality of initial machine learning models.

The plurality of initial machine learning models may be validated using the validation data. Each initial machine learning model may be assigned a score based on the validation.

In some embodiments, the score of an initial machine learning model is the overall validation score of the initial machine learning model. The validation data is comprised of a plurality of entries. For each entry of the validation data, the predicted feature label outputted by an initial machine learning model may be compared to the actual feature value. For example, the predicted feature label for a feature "age" may be "21" and the actual feature value for the feature "age" is "18." The validation score of a prediction associated with an entry may be determined by computing (1). The overall validation score of the initial machine learning model may be determined by computing (2).

In other embodiments, the validation score of the initial machine learning model is a sampled validation of the initial machine learning model. The validation data is comprised of a plurality of entries. A first subset of the plurality of entries (e.g., predetermined number) may be randomly selected. The validation score of the prediction associated with each entry of the subset of the plurality of entries may be determined by computing (1). The overall validation score for a subset of the plurality of entries may be determined by computing (2). A second subset of the plurality of entries (e.g., predetermined number) may be randomly selected. The second subset may include some or none of the entries included in the first subset of the plurality of entries. The validation score of the prediction associated with each entry of the second subset of the plurality of entries may be determined by computing (1). The overall validation score for the second subset of the plurality of entries may be determined by computing (2). A predetermined number of subsets and corresponding overall subset validation scores may be determined. The sampled validation score of the initial machine learning model may be determined as:

$$\text{Sampled Validation Score} = \frac{\sum \text{overall validation for each Subset}}{\# \text{ of Subsets}} \quad (4)$$

The plurality of initial machine learning models may be ranked based on the score. For example, four different machine learning models may be generated and ranked based on their corresponding scores.

At 304, the plurality of machine learning models are filtered based on their corresponding scores.

For the first iteration, the plurality of machine learning models may be comprised of the plurality of initial machine learning models. In some embodiments, the top performing machine learning models (e.g., top half, top number, top 10%, etc.) of the plurality of initial machine learning models are retained as surviving machine learning models and the non-top performing machine learning models (e.g., bottom half, all models except for the top two, bottom 90%, etc.) of the plurality of initial machine learning models are discarded, based in part on a pair-wise elimination after random pair assignment. For example, the plurality of initial machine learning models may be comprised of four different machine learning models. The top two machine learning models may be retained and the non-top two machine learning models may be discarded. In other embodiments, an initial machine learning model is paired with another initial machine learning model and the two initial machine learning models are compared with each other (i.e., head-to-head). For example, a first initial machine learning model is paired with a second initial machine learning model and a third initial machine learning model is paired with a fourth initial machine learning model. Between the first initial machine learning model and the second initial learning model, the machine learning model with the higher overall validation score may be retained as a surviving machine learning model and the lower overall validation score may be discarded. Between the third initial machine learning model and the fourth initial learning model, the machine learning model with the higher overall validation score may be retained as a surviving machine learning model and the machine learning model with the lower overall validation score may be discarded.

For subsequent iterations, the plurality of machine learning models may be comprised of one or more surviving machine learning models and one or more evolved machine learning models. In some embodiments, the top performing machine learning models (e.g., top half, top number, top 10%, etc.) of the one or more surviving machine learning models and the one or more evolved machine learning models are retained as surviving machine learning models and the non-top performing machine learning models (e.g., bottom half, all models except for the top two, bottom 90%, etc.) the one or more surviving machine learning models and the one or more evolved machine learning models are discarded, based in part on a pair-wise elimination after random pair assignment. For example, the plurality of machine learning models may be comprised of two surviving machine learning models and two evolved machine learning models. The top two machine learning models (a surviving machine learning model or an evolved machine learning model) may be retained as a surviving machine learning model and the non-top two machine learning models may be discarded, based in part on a pair-wise elimination after random pair assignment. In other embodiments, the one or more surviving machine learning models are paired with a respective evolved machine learning model and the two machine learning models are compared with each other (i.e., head-to-head). For example, a first surviving machine learning model is paired with a first evolved machine learning model and a second surviving machine learning model is paired with a second evolved machine learning model. Between the first surviving machine learning model and the first evolved machine learning model, the machine learning model with the higher overall validation score may be retained a surviving machine learning model and the machine learning model with the lower overall validation score may be discarded. Between the second surviving machine learning model and the second evolved machine learning model, the machine learning model with the higher overall validation score may be retained a surviving machine learning model and the machine learning model with the lower overall validation score may be discarded. In some embodiments, the evolved machine learning model must have an overall validation score that is greater than a threshold statistical measure in order to replace the surviving machine learning model. For example, the overall validation score of the evolved machine learning model must be greater than all of the entry validation scores of a surviving machine learning model. This reduces overfitting of the data that may occur by generating the evolved machine learning machines.

At 306, one or more evolved machine learning models are generated. An evolved machine learning model is a model that may be based on a surviving machine learning model. The evolved machine learning model is configured make a prediction for the same feature that the surviving machine learning model is configured to make. A surviving machine learning model is a model that was not filtered out at 304. One or more important features of which the surviving machine learning model is based may be determined and used to generate one or more new features that are not included in the input data.

An important feature may be determined based on the number of times a feature is used to split a decision tree. An important feature may be determined based on a location of the feature within the decision tree split. For example, a feature that is used to split a decision tree at the top of the decision tree may be more important than a feature that is used to split a decision tree at the bottom of the decision tree. In some embodiments, the feature values corresponding to the feature of the input data are randomly rearranged and the predictions of a machine learning model that is based at least in part on the feature are repeated. In the event the validation score of the machine learning model improves with the random feature data, the feature is determined to be an untrustworthy feature and not to be an important feature. In the event the validation score of the machine learning model does not change within a threshold statistical amount (e.g., 5%) with the random feature data, the feature is determined not to be an important feature. In the event the validation score of the machine learning model decreases more than a threshold statistical amount (e.g., 5%) with the random feature data, the feature is determined to be an important feature.

The one or more new features may be generated using a transformation. The transformation may combine two or more features into a single feature. The transformers may include a filter transformer, a frequent transformer, a bulk interactions transformer, a truncated SVD numeric transformer, a cross validation target encoding, a label encoding transformer, a dates transformer, a date polar transformer, a text transformer, a categorical target encoding transformer, a numeric to categorical target encoding transformer, a cluster target encoding transformer, a cluster distance transformer, a weight of evidence, and/or a numeric to categorical weight of evidence transformer. In some embodiments, a transformer is randomly selected. In other embodiments, a transformer is selected based on a data type associated with a feature. For example, a feature value may be a numerical value, a categorical value (e.g., Male/Female, Red/Blue, Sunny/Rainy, etc.), an ordinal value (first, second, third, etc.), etc. A transformer that receives a numerical value and a categorical value as input may be selected in the event the surviving machine learning model is based on a plurality of features where at least one feature value type is a numerical value and at least one feature value type is a categorical value.

The one or more new features may be used to generate an evolved machine learning model. In some embodiments, the evolved machine learning model is similar to a surviving machine learning model except that the evolved machine learning model includes the one or more new features and excludes the one or more features of which the one or more new features are based. In other embodiments, the evolved machine learning model is based on the one or more new features and one or more original features.

One or more evolved machine learning models may be generated. The evolved machine learning models may be generated based on a machine learning algorithm (e.g., decision trees, naïve Bayes classification, least squares regression, logistic regression, support vector machines, neural networks, deep learning, etc.). In some embodiments, an evolved machine learning model is generated using the same machine learning algorithm type as a surviving machine learning model and/or other evolved machine learning models, but the subset of features associated with the evolved machine learning model is different than the subset of features associated with the surviving machine learning model and the subset of features associated with the other evolved machine learning models. In other embodiments, the evolved machine learning model is generated using a different machine learning algorithm type as other surviving machine learning models and/or evolved machine learning models. In some embodiments, the evolved machine learning model may generated based on the same subset of features as a second evolved machine learning model, but the first and second evolved machine learning models are generated using different machine learning algorithm types.

The overall validation score (e.g., overall accuracy) of each evolved machine learning model may be determined. The overall validation score of the evolved machine learning models may be compared to the overall validation score of the surviving machine learning models. In some embodiments, the top performing machine learning models (e.g., top half, top number, top 10%, etc.) of the one or more surviving machine learning models and the one or more evolved machine learning models are retained as surviving machine learning models and the non-top performing machine learning models (e.g., bottom half, all models except for the top two, bottom 90%, etc.) the one or more surviving machine learning models and the one or more evolved machine learning models are discarded or replaced with one or more evolved machine learning models. For example, the plurality of machine learning models may be comprised of two surviving machine learning models and two evolved machine learning models. The top two machine learning models (a surviving machine learning model or an evolved machine learning model) may be retained as a surviving machine learning model and the non-top two machine learning models may be discarded or replaced with an evolved machine learning model. In other embodiments, the one or more surviving machine learning models are paired with a respective evolved machine learning model and the two machine learning models are compared with each other (i.e., head-to-head). For example, a first surviving machine learning model is paired with a first evolved machine learning model and a second surviving machine learning model is paired with a second evolved machine learning model. Between the first surviving machine learning model and the first evolved machine learning model, the machine learning model with the higher overall validation score may be retained a surviving machine learning model and the machine learning model with the lower overall validation score may be replaced with an evolved machine learning model. Between the second surviving machine learning model and the second evolved machine learning model, the machine learning model with the higher overall validation score may be retained a surviving machine learning model and the machine learning model with the lower overall validation score may be replaced with an evolved machine learning model. In some embodiments, the evolved machine learning model must have an overall validation score that is greater than a threshold statistical measure in order to replace the surviving machine learning model. For example, the surviving machine learning model has an entry validation score associated with each entry of the validation data. In some embodiments, the overall validation score of the evolved machine learning model must be outside the distribution of the entry validation scores to be considered an improvement over the surviving machine learning model.

At 308, it is determined whether a stopping condition has been reached. In some embodiments, a stopping condition is a number of iterations (e.g., 5000). In other embodiments, a stopping condition is a duration (e.g., 10 minutes).

In the event the stopping condition has not been reached, process 300 returns to 304. In the event the stopping condition has been reached, process 300 proceeds to 310 and the one or more surviving machine learning models are retained.

The iterative process of comparing evolved machine learning models to surviving machine learning models improves the feature value prediction accuracy because the process seeks to improve the prediction with each iteration. The machine learning models that are retained at 310 will provide a better prediction (i.e., more accurate) for the feature than the initial machine learning models.

Figure 4:
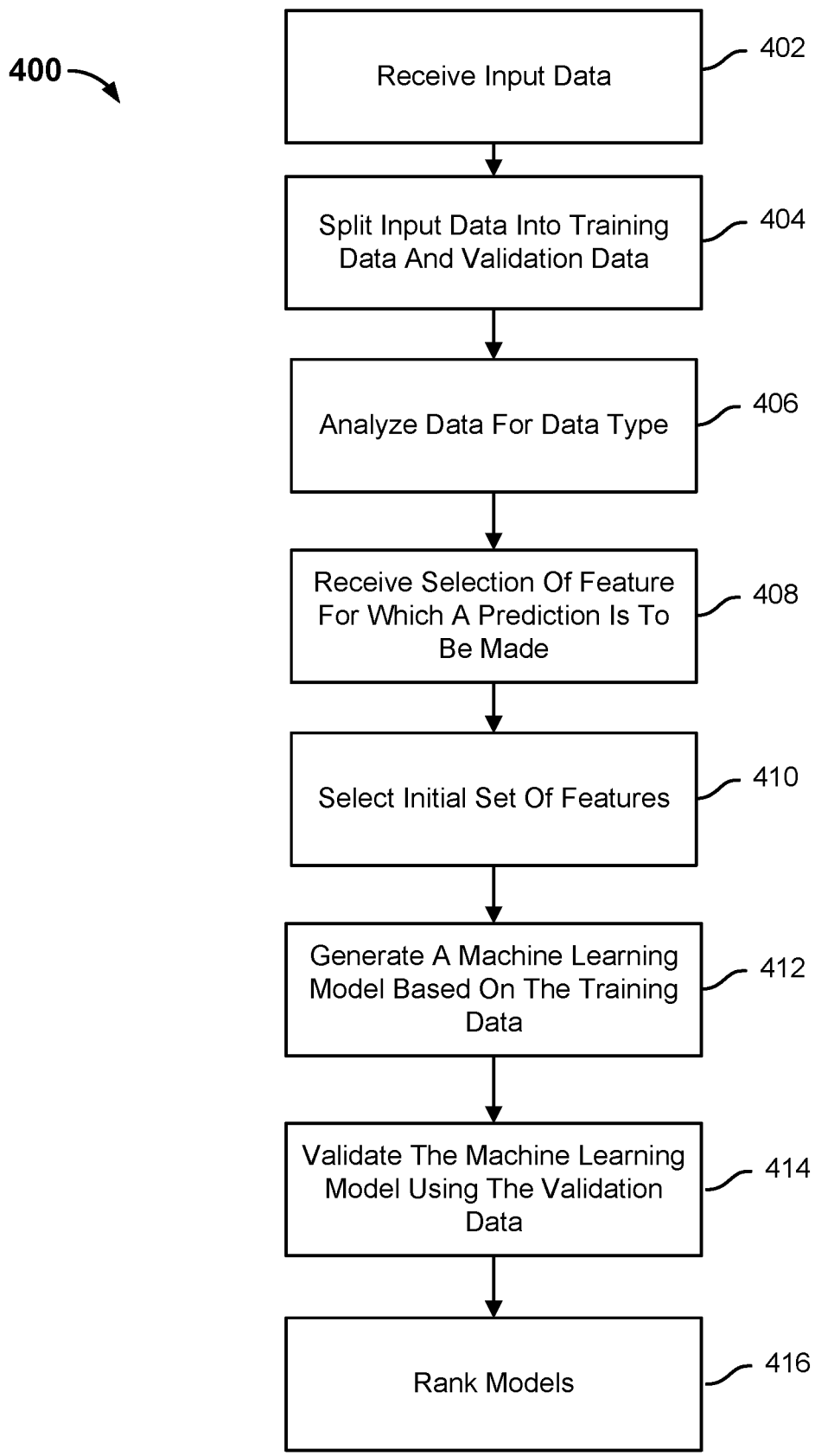
FIG. 4 is a flow chart illustrating an embodiment of a process for determining a plurality of initial machine learning models.

FIG. 4 is a flow chart illustrating an embodiment of a process for determining a plurality of initial machine learning models. Process 400 may be implemented by a server, such as server 102. In some embodiments, process 400 is used to perform some or all of 302 of process 300.

At 402, input data is received. The input data is comprised of a plurality of entries. Each entry is associated with a plurality of features and corresponding feature values. For example, input data may be in the form of a dataset, such as input dataset 200. The input data may be received from a client, such as client 122, or a remote device.

At 404, input data is split into training data and validation data. Training data may be used to train a machine learning model. Validation data may be used to validate the trained machine learning model. In some embodiments, the training data includes more entries of the input data than the validation data (e.g., 80% of the entries are used for training data, 20% of the entries are used for validation data). In other embodiments, the training data includes an equal number of entries of the input data as the validation data (e.g., 50% of the entries are used for training data, 50% of the entries are used for validation data). In other embodiments, the training data includes less entries of the input data than the validation data (e.g., 40% of the entries are used for training data, 60% of the entries are used for validation data).

At 406, the input data is analyzed for data type. A feature value may be a numerical value, a categorical value (e.g., Male/Female, Red/Blue, Sunny/Rainy, etc.), an ordinal value (first, second, third, etc.), etc. The data type associated with a feature value (e.g., float, integer, string, etc.) is determined. In some embodiments, a string feature value is transformed into a numerical value. For example, a feature of "gender" and a feature value of "male" or "female" may be transformed into a numerical value of "1" and "0", respectively.

At 408, a selection of a feature for which a prediction is to be made is received. In some embodiments, the selected feature is one of the features included in the input data. In some embodiments, the selected feature is a feature that is not included in the input data. The selection may be received from a client device, such as client device 122. The selected feature is a feature for which all initial machine learning models will be trained to predict.

At 410, an initial set of features are selected for each initial machine learning model. An initial set of features may include some or all of the features of the input data. The initial set of features does not included the selected feature. In some embodiments, the initial set of features are randomly selected. In other embodiments, the initial set of features are selected by an algorithm. The initial set of features for a first initial machine learning model may include none, some, or all of the same features as the initial set of features for a second initial machine learning model.

At 412, a plurality of initial machine learning models are generated based on the training data. The initial machine learning models may be generated based on a machine learning algorithm (e.g., decision trees, naïve Bayes classification, least squares regression, logistic regression, support vector machines, neural networks, deep learning, etc.). Some of the machine learning models may use the same machine learning algorithm, while others may use different algorithms. Given the initial set of features and corresponding feature values, the machine learning model is configured to output a predicted feature label for the selected feature. In some embodiments, the machine learning model outputs a predicted value for the selected feature. In other embodiments, the machine learning model is configured to output the predicted label for the selected feature and a confidence value associated with the predicted value. In other embodiments, the machine learning model is configured to output the predicted label for the selected feature and a range associated with the predicted value (e.g., ±5).

Once an initial machine learning model has been trained, the predicted label for the selected feature can be compared to the actual value of the selected feature. The machine learning model may be retrained based on the comparison, for example, to fine tune the machine learning model to make a more accurate prediction. In some embodiments, one or more weights associated with the machine learning model are adjusted to improve the accuracy of the machine learning model.

At 414, the initial machine learning models are validated using the validation data. The validation data is inputted to a machine learning model. Given the features associated with a machine learning model and corresponding feature values are provided to a machine learning model. The machine learning model is configured to output a predicted label for the selected feature based on the associated validation features and corresponding feature values. A score can be assigned to a machine learning model based on a validation score associated with the machine learning model.

In some embodiments, the score of an initial machine learning model is the overall validation score (e.g., overall accuracy) of the initial machine learning model. The validation data is comprised of a plurality of entries. For each entry of the validation data, the predicted feature label outputted by an initial machine learning model may be compared to the actual feature value. For example, the predicted feature label for a feature "age" may be "21" and the actual feature value for the feature "age" is "18." The validation score of a prediction associated with an entry may be determined by computing (1). The overall validation score of the initial machine learning model may be determined by computing (2).

In other embodiments, the score of the initial machine learning model is a sampled validation score of the initial machine learning model. The validation data is comprised of a plurality of entries. A first subset of the plurality of entries (e.g., predetermined number) may be randomly selected. The validation score of the prediction associated with each entry of the subset of the plurality of entries may be determined. The overall validation score for a subset of the plurality of entries may be determined. A second subset of the plurality of entries (e.g., predetermined number) may be randomly selected. The second subset may include some or none of the entries included in the first subset of the plurality of entries. The validation score of the prediction associated with each entry of the second subset of the plurality of entries may be determined. The overall validation score for the second subset of the plurality of entries may be determined. A predetermined number of subsets and corresponding overall subset validation scores may be determined. The sampled validation of the initial machine learning model may be determined as:

$$\text{Sampled Validation Score} = \frac{\sum \text{overall validation score for each Subset}}{\text{\# of Subsets}}. \quad (5)$$

At 416, the initial machine learning models are ranked based on the corresponding scores.

Figure 5:
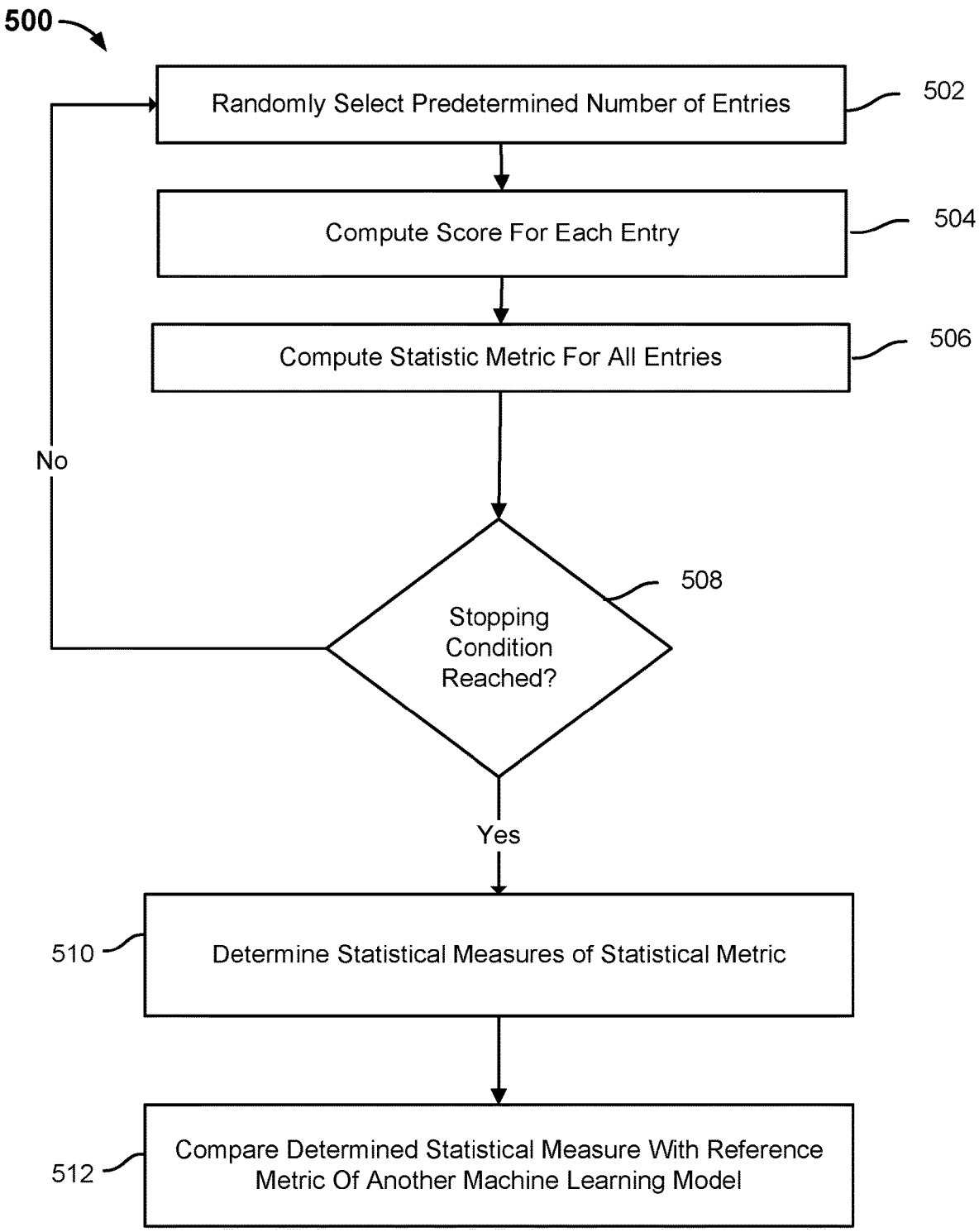
FIG. 5 is a flow chart illustrating an embodiment of a process for filtering models.

FIG. 5 is a flow chart illustrating an embodiment of a process for filtering models. Process 500 may be implemented by a server, such as server 102. In some embodiments, process 500 is used to perform some or all of 304 of process 300.

At 502, a predetermined number of entries are randomly selected. In some embodiments, the predetermined number of entries are selected from training data. In other embodiments, the predetermined number of entries are selected from validation data. In other embodiments, the predetermined number of entries are selected from a combination of training data and validation data.

At 504, a score is computed for each entry. The score may represent an accuracy of the machine learning model for that particular entry. A machine learning model is configured to output a predicted label for a feature. The actual value of the feature is known from the input data. The validation score (e.g., accuracy) for an entry may be determined by computing (1).

At 506, a statistical metric is computed for all of the randomly selected entries. The statistical metric may be the overall validation score of the machine learning model for all entries. The overall validation score may be determined by computing (2).

At 508, it is determined whether a stopping condition has been reached. In some embodiments, a stopping condition is a threshold number of iterations. In other embodiments, a stopping condition is a duration. In the event the stopping condition has not been reached, process 500 proceeds to 502 where a predetermined number of entries may be randomly selected again. The predetermined number of entries may include entries that were used in a previous iteration to compute a validation score (e.g., accuracy) of the machine learning model. In the event the stopping condition has been reached, process 500 proceeds to 510.

At 510, one or more statistical measures of the statistical metric are determined. In some embodiments, a statistical measure is a distribution of the validation scores. In other embodiments, a statistical measure is an average of the overall validation scores that were computed.

At 512, the determined statistical metric is compared with a reference metric of another machine learning model. In some embodiments, the other machine learning model is a surviving machine learning model. In other embodiments, the other machine learning model is an evolved machine learning model. For example, the average of the overall accuracies may be compared to a distribution of the entry validation scores of another model. It may be determined whether the average of the overall accuracies exceeds the distribution of the entry validation scores of another model. In the event the average of the overall accuracies exceeds the distribution of the entry validation scores of another model, the model is determined to be an improvement of the other model and replaces the other model as a surviving machine learning model.

Figure 6:
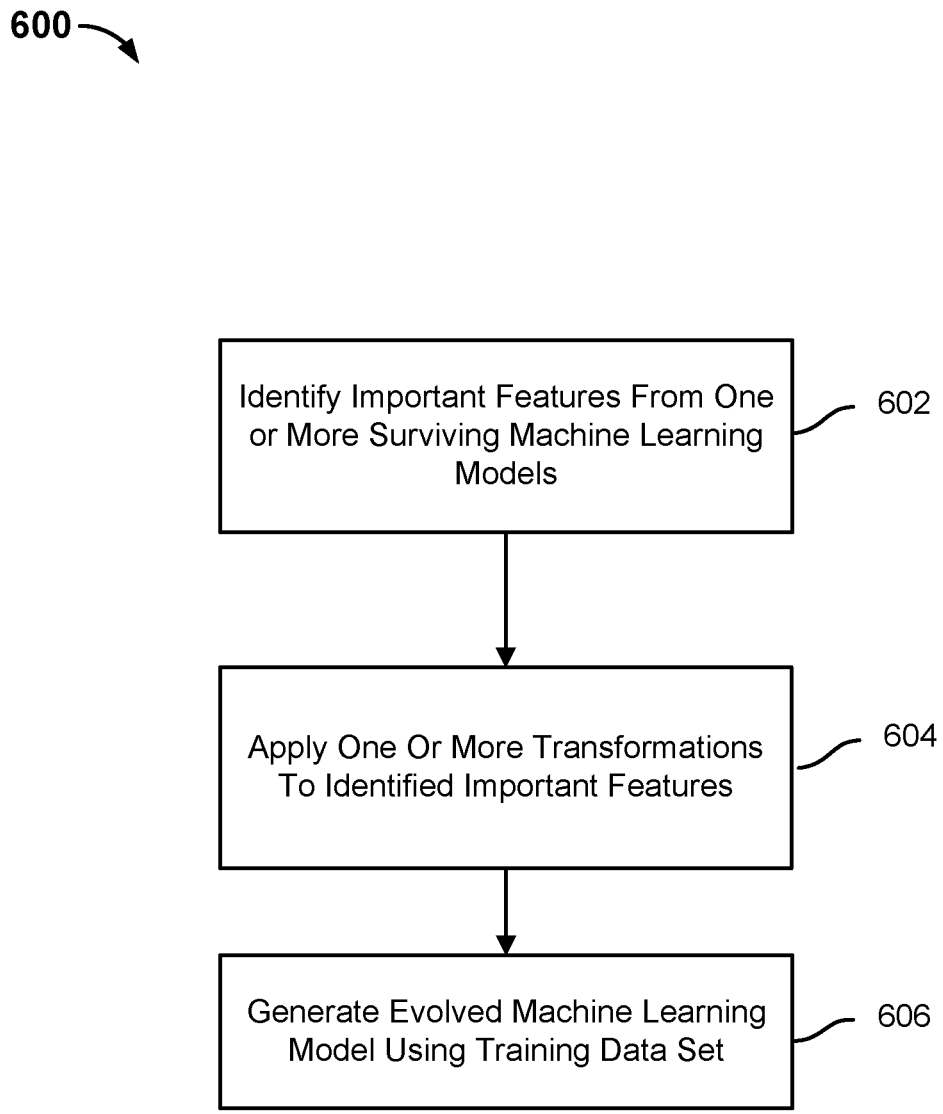
FIG. 6 is a flow chart illustrating a process for generating an evolved machine learning model.

FIG. 6 is a flow chart illustrating a process for generating an evolved machine learning model. Process 600 may be implemented by a server, such as server 102. In some embodiments, process 600 is used to perform some or all of 306 of process 300.

At 602, one or more important features of one or more surviving machine learning models are identified.

In some embodiments, the one or more important features are determined based on the number of times a feature is used to split a decision tree. The one or more important features may be determined based on a location of the feature within the decision tree split. For example, a feature that is used to split a decision tree at the top of the decision tree may be more important than a feature that is used to split a decision tree at the bottom of the decision tree.

In some embodiments, the feature values corresponding to the feature of the input data are randomly rearranged and the predictions of a machine learning model that is based at least in part on the feature are repeated. In the event the validation score of the prediction of the machine learning model improves with the random feature data, the feature is determined to be an untrustworthy feature and not to be an important feature. In the event the validation score of the prediction of the machine learning model does not change within a threshold statistical amount (e.g., 5%) with the random feature data, the feature is determined not to be an important feature. In the event the validation score of the prediction of the machine learning model decreases more than a threshold statistical amount (e.g., 5%) with the random feature data, the feature is determined to be an important feature.

At 604, one or more transformations are applied to the identified one or more important features to generate one or more new features. In some embodiments, a transformation is applied to one of the identified important features. In some embodiments, a transformation is applied to a plurality of the identified important features. In other embodiments, a transformation is applied to at least one of the identified important features and one or more features that were not identified as being an important feature.

The one or more new features may be generated using a transformation. The transformers may include a filter transformer, a frequent transformer, a bulk interactions transformer, a truncated SVD numeric transformer, a label encoding transformer, cross validation categorical to numeric encoding transformer, a dates transformer, a date polar transformer, a text transformer, a categorical target encoding transformer, a numeric to categorical target encoding transformer, a cluster target encoding transformer, a cluster distance transformer, a weight of evidence, and/or a numeric to categorical weight of evidence transformer. In some embodiments, a transformer is randomly selected. In other embodiments, a transformer is selected based on a data type associated with a feature. For example, a feature value may be a numerical value, a categorical value (e.g., Male/Female, Red/Blue, Sunny/Rainy, etc.), an ordinal value (first, second, third, etc.), etc. A transformer that receives a numerical value and a categorical value as input may be selected in the event the surviving machine learning model is based on a plurality of features where at least one feature value type is a numerical value and at least one feature value type is a categorical value.

The one or more new features may be used to generate an evolved machine learning model. In some embodiments, the evolved machine learning model is similar to a surviving machine learning model except that the evolved machine learning model includes the one or more new features and excludes the one or more original features of which the one or more new features are based. In other embodiments, the evolved machine learning model is based on the one or more new features and one or more original features.

At 606, the evolved machine learning model is generated using the training data set. The evolved machine learning model is configured to make a prediction value for the same feature as an initial machine learning model. One or more evolved machine learning models may be generated. An evolved machine learning model may be trained using one or more new features and a subset of the original features. In some embodiments, the subset of the original features does not include the one or more original features of which the one or more new features are based. An evolved machine learning model may be generated using the same machine learning algorithm as a surviving machine learning model or a different machine learning algorithm. The predicted feature label of an evolved machine learning model is compared to the actual feature value of the training data. The evolved machine learning model may be adjusted based on the comparison. For example, one or more weights associated with the one or more features included in the evolved machine learning model may be adjusted so that the evolved machine learning model provides a predication that is closer to the actual feature value of the training data.

Figure 7:
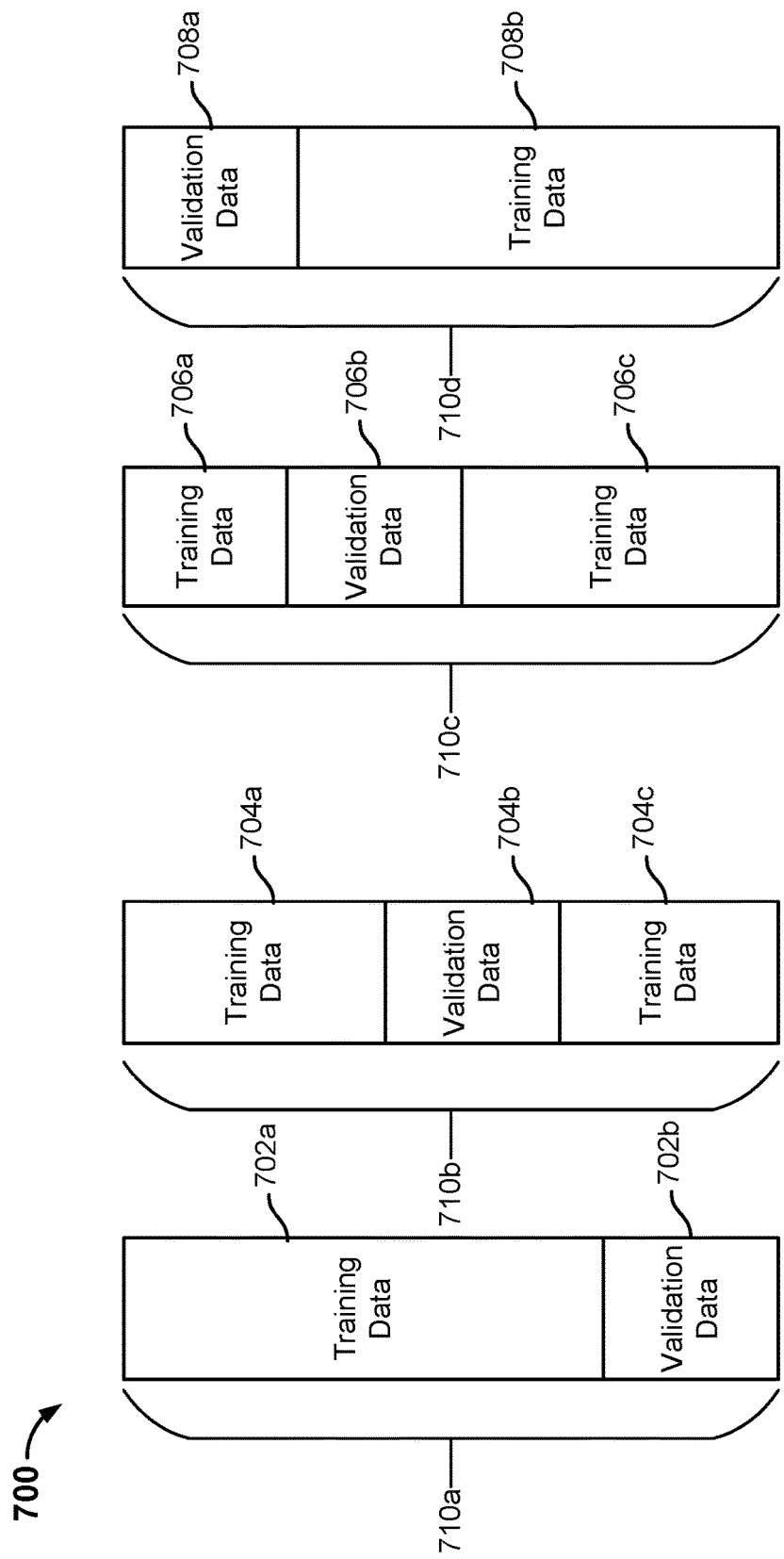
FIG. 7 is a diagram illustrating an embodiment of training and validation datasets.

FIG. 7 is a diagram illustrating an embodiment of training and validation datasets.

In the example shown, training and validation datasets 710a, 710b, 710c, 710d are examples of input data that is recited by a server, such as server 102. Input data may be split into different versions of training and validation datasets. Training and validation datasets 710a, 710b, 710c, 710d each include the same set of data, but the manner in which each dataset is divided is different. Training and validation dataset 610a includes training data 702a and validation data 702b. Training and validation dataset 710b includes training data 704a, validation data 704b, and training data 704c. Training and validation dataset 710c includes training data 706a, validation data 706b, and 706c. Training and validation dataset 710d includes validation data 708a and training data 708b.

The validation data for a training and validation dataset may be any portion of the training and validation dataset. In some embodiments, the number of entries of the validation data is the same number of entries between a plurality of training and validation datasets. In some embodiments, the number of entries of the validation data for a training and validation dataset is less than the number of entries of the training data for the training and validation dataset. In other embodiments, the number of entries of the validation data is equal to the number of entries of the training data for a training and validation dataset. In other embodiments, the number of entries of the validation data is greater than the number of entries of the training data for a training and validation dataset.

A plurality of machine learning models may be generated for each training and validation dataset. A machine learning model may be trained using corresponding training data of a corresponding training and validation dataset and validated using corresponding validation data of the corresponding training and validation dataset. For example, a first machine learning model, a second machine learning model, and a third machine learning model may be generated using training and validation dataset 710a. A fourth machine learning model, a fifth machine learning model, and a sixth machine learning model may be generated using training and validation dataset 710b. A seventh machine learning model, an eighth machine learning model, and a ninth machine learning model may be generated using training and validation dataset 710c. A tenth machine learning model, an eleventh machine learning model, and a twelfth machine learning model may be generated using training and validation dataset 71da.

Figure 8:
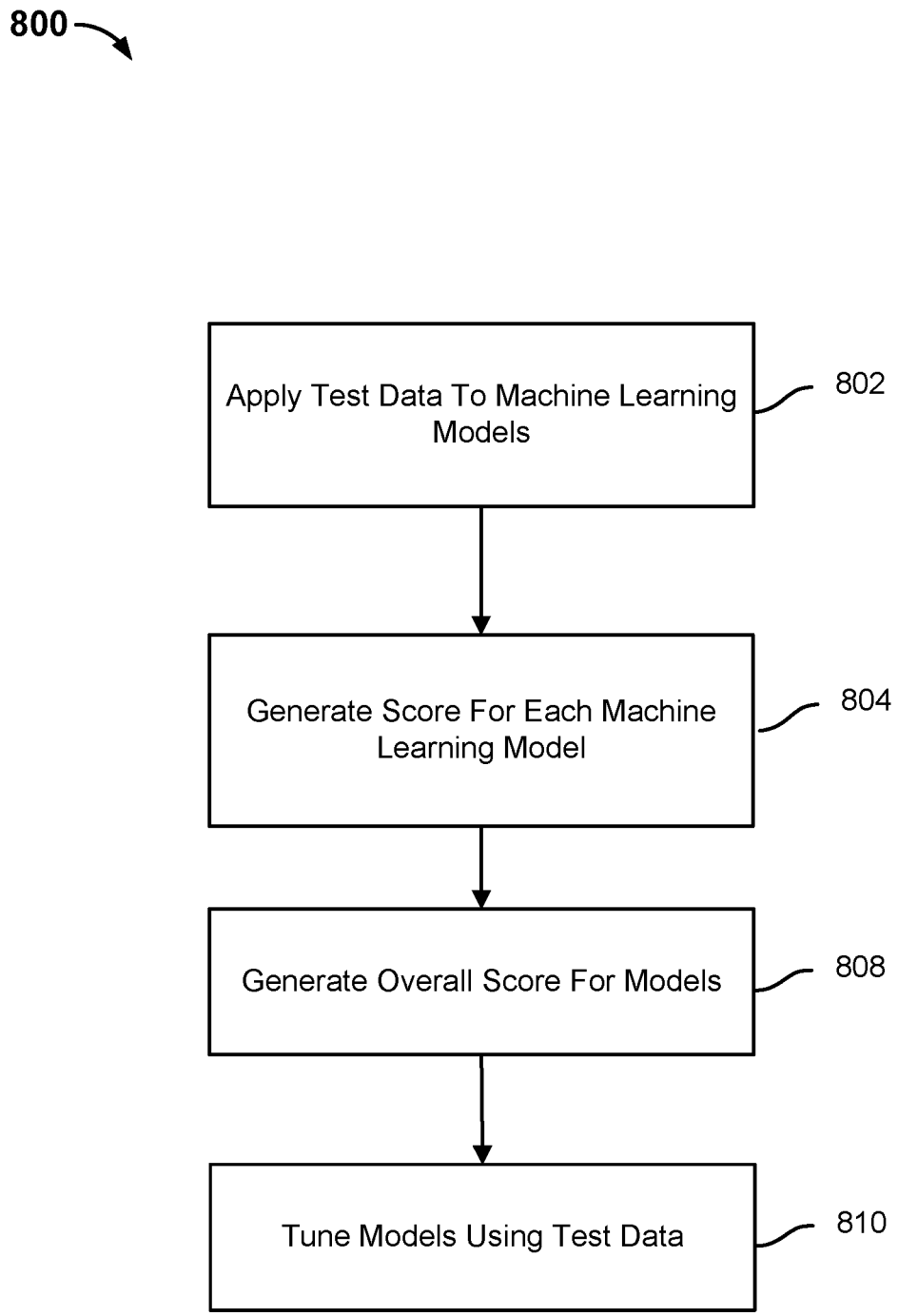
FIG. 8 is a flow chart illustrating an embodiment of a process for generating an ensemble model.

FIG. 8 is a flow chart illustrating an embodiment of a process for generating an ensemble model. Process 800 may be implemented by a server, such as server 102.

At 802, test data is applied to each of the machine learning models. Test data includes data that was not included in a previous dataset. Test data may be comprised of one or more entries. Each entry includes a plurality of features and corresponding feature values.

At 804, a score is generated for each machine learning model. The test data is inputted to a machine learning model. The test data may be comprised of one or more entries. The machine learning model is configured to output a prediction label for a particular feature. The actual value of the particular value is included in the test data. The validation score of a machine learning model may be determined by computing (1) and/or (2).

At 806, an overall score is generated for all models. The overall score may be an overall validation score of the models. For example, the sum of the validation scores for each machine learning model may be summed and divided over the total number of machine learning models.

At 808, the models are tuned using the test data. For example, a weight associated with one or more of the machine learning models may be adjusted so that the overall score for the models is increased. For example, the overall score for the models may be computed as:

$$\text{Overall Score} = \frac{\sum_{i=0}^{n} a_i M_i}{n}$$

where n is the number of machine learning models, $a_i$ is a weight and $M_i$ is validation score associated with a machine learning model. In other embodiments, one or more weights associated weights associated with a machine learning model may be adjusted to improve the accuracy for a particular model. For example, the predicted value for a feature may be represented as $\alpha x + by + cz = m$. The one or more weights associated with a particular model may be adjusted such that $\alpha_i \cdot \alpha x + by + cz = m$.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
generating a plurality of machine learning models to make a prediction for a selected feature, wherein generating the plurality of machine learning models includes:
determining a plurality of initial machine learning models based on a plurality of original features included in an input dataset;
filtering the plurality of initial machine learning models, wherein filtering the plurality of initial machine learning models at least includes pairing a first initial machine learning model with a second initial machine learning model, pairing a third initial machine learning model with a fourth initial machine learning model, and selecting a subset of the initial machine learning models to be included in a set of surviving machine learning models, wherein the first initial machine learning model or the second initial machine learning model is selected to be included in the set of surviving machine learning models based on which corresponding validation score is higher and wherein the third initial machine learning model or the fourth initial machine learning model is selected to be included in the set of surviving machine learning models based on which corresponding validation score is higher;
generating one or more evolved machine learning models, wherein a first evolved machine learning model of the one or more evolved machine learning models is generated based at least in part on one or more new features, wherein the one or more new features are based at least in part on a transformation of at least one feature associated with a surviving machine learning model included in the set of surviving machine learning models;
comparing a validation score associated with the first evolved machine learning model with a validation score associated with a first surviving machine learning model; and
selecting the first evolved machine learning model or the first surviving machine learning model to be a retained machine learning model based on a comparison of the validation score associated with the first evolved machine learning model with the validation score associated with a first surviving machine learning model, wherein the first evolved machine learning model or the first surviving machine learning model is selected based on which has a higher corresponding validation score; and
providing to a client device the prediction for the selected feature using the retained machine learning model.

2. The method of claim 1, further comprising receiving the input dataset.

3. The method of claim 2, wherein the input dataset includes corresponding feature values associated with the plurality of original features.

4. The method of claim 3, wherein the corresponding feature values have corresponding data types.

5. The method of claim 1, wherein the transformation is selected based at least in part on corresponding data types associated with the plurality of original features.

6. The method of claim 1, wherein the plurality of initial machine learning models are based on a subset of the original features.

7. The method of claim 1, wherein generating the one or more evolved machine learning models includes determining one or more important features of the plurality of original features.

8. The method of claim 7, wherein the one or more important features are determined based on a number of times a feature is used in a decision tree.

9. The method of claim 7, wherein determining the one or more important features of the plurality of original features includes:
selecting one of the original features;
randomizing feature values associated with the selected feature; and
determining an overall validation score of an initial machine learning model based at least in part on the selected feature having the randomized feature values.

10. The method of claim 9, wherein the selected feature is determined to be an important feature in response to determining that the validation score of the initial machine learning model decreases more than a threshold statistical amount.

11. The method of claim 1, wherein filtering the plurality of initial machine learning models includes:
randomly selecting a predetermined number of entries of the input dataset;
determining a validation score associated with each entry of the randomly selected entries; and
determining an overall validation score based at least in part on the validation score associated with each entry of the randomly selected entries.

12. The method of claim 1, wherein an evolved machine learning model is selected in the event an overall accuracy of the evolved machine learning model is greater than a statistical measure of at least one of the surviving machine learning models.

13. The method of claim 1, wherein the plurality of machine learning models are generated until a stopping condition has been reached.

14. The method of claim 1, further comprising:
determining that a stopping condition has not occurred; and
filtering one or more surviving machine learning models included in the set of surviving machine learning models and the one or more evolved machine learning models based at least in part on corresponding validation scores associated with the one or more surviving machine learning models and the one or more evolved machine learning models.

15. The method of claim 1, further comprising:
determining that a stopping condition has occurred;
selecting a machine learning model with the corresponding highest validation score; and
outputting a prediction label corresponding to the selected feature of the plurality of original features.

16. The method of claim 1, wherein one of the one or more new features is based in part on a first feature from the first surviving machine learning model and a second feature from the second surviving machine learning model.

17. The method of claim 1, further comprising:
filtering one or more surviving machine learning models based at least in part on corresponding validation scores associated with the one or more surviving machine learning models, wherein filtering the one or more surviving machine learning models includes selecting a subset of the one or more surviving machine learning models as the one or more new surviving machine learning models;

generating one or more new evolved machine learning models, wherein at least one of the new evolved machine learning models is based at least in part on a second set of one or more new features, wherein the second set of one or more new features are based at least in part on a second transformation of at least one of the features of the one or more new surviving machine learning models;

comparing corresponding validation scores associated with the one or more new evolved machine learning models and the one or more new surviving machine learning models; and selecting based on the comparison of the corresponding validation scores, at least one of the one or more new evolved machine learning models or the one or more new surviving machine learning models as a second set of one or more new surviving machine learning models.

18. A system, comprising:
a processor configured to:
  generate a plurality of machine learning models to make a prediction for a selected feature, wherein to generate the plurality of machine learning models, the processor is configured to:
    determine a plurality of initial machine learning models based on a plurality of original features included in an input dataset;
    filter the plurality of initial machine learning models, wherein to filter the plurality of initial machine learning models, the processor is configured to pair a first initial machine learning model with a second initial machine learning model, pair a third initial machine learning model with a fourth initial machine learning model, and select a subset of the initial machine learning models to be included in a set of surviving machine learning models, wherein the first initial machine learning model or the second initial machine learning model is selected to be included in the set of surviving machine learning models based on which corresponding validation score is higher and wherein the third initial machine learning model or the fourth initial machine learning model is selected to be included in the set of surviving machine learning models based on which corresponding validation score is higher;
    generate one or more evolved machine learning models, wherein a first evolved machine learning model of the one or more evolved machine learning models is generated based at least in part on one or more new features, wherein the one or more new features are based at least in part on a transformation of at least one feature associated with a surviving machine learning model included in the set of surviving machine learning models;
    compare a validation score associated with the first evolved machine learning model with a validation score associated with a first surviving machine learning model; and
    select the first evolved machine learning model or the first surviving machine learning model to be a retained machine learning model based on a comparison of the validation score associated with the first evolved machine learning model with the validation score associated with a first surviving machine learning model, wherein the first evolved machine learning model or the first surviving machine learning model is selected based on which has a higher corresponding validation score; and
  provide to a client device the prediction for the selected feature using the retained machine learning model; and
a memory coupled to the processor and configured to provide the processor with instructions.

19. The system of claim 18, wherein to generate the one or more evolved machine learning models, the processor is further configured to determine one or more important features of the plurality of original features.

20. A computer program product, the computer program product being embodied in a non-transitory computer readable storage medium and comprising computer instructions for:
  generating a plurality of machine learning models to make a prediction for a selected feature, wherein generating the plurality of machine learning models includes:
    determining a plurality of initial machine learning models based on a plurality of original features included in an input dataset;
    filtering the plurality of initial machine learning models, wherein filtering the plurality of initial machine learning models at least includes pairing a first initial machine learning model with a second initial machine learning model, pairing a third initial machine learning model with a fourth initial machine learning model, and selecting a subset of the initial machine learning models to be included in a set of surviving machine learning models, wherein the first initial machine learning model or the second initial machine learning model is selected to be included in the set of surviving machine learning models based on which corresponding validation score is higher and wherein the third initial machine learning model or the fourth initial machine learning model is selected to be included in the set of surviving machine learning models based on which corresponding validation score is higher;
    generating one or more evolved machine learning models, wherein a first evolved machine learning model of the one or more evolved machine learning models is generated based at least in part on one or more new features, wherein the one or more new features are based at least in part on a transformation of at least one feature associated with a surviving machine learning model included in the set of surviving machine learning models;
    comparing a validation score associated with the first evolved machine learning model with a validation score associated with a first surviving machine learning model; and
    selecting the first evolved machine learning model or the first surviving machine learning model to be a retained machine learning model based on a comparison of the validation score associated with the first evolved machine learning model with the validation score associated with a first surviving machine learning model, wherein the first evolved machine learning model or the first surviving machine learning model is selected based on which has a higher corresponding validation score; and
  providing to a client device the prediction for the selected feature using the retained machine learning model.

* * * * *